United States Patent
Forbes et al.

(10) Patent No.: US 6,561,355 B1
(45) Date of Patent: *May 13, 2003

(54) GARMENT BAG HAVING ODOR AND SCENT-CONTROLLING CAPABILITIES

(75) Inventors: David R. Forbes, Cedar Rapids, IA (US); Carman S. Forbes, Cedar Rapids, IA (US); Ron M. Bean, Cedar Rapids, IA (US)

(73) Assignee: Hunter's Specialties, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/492,048

(22) Filed: Jan. 26, 2000

(51) Int. Cl.⁷ .......................... B65D 79/00; B65D 85/18
(52) U.S. Cl. .................... 206/527; 206/278; 206/278.1; 383/61.3; 383/97; 190/903
(58) Field of Search ................. 206/278, 278.1, 206/527; 383/61.97, 61.1, 61.2, 61.3; 190/903

(56) References Cited

U.S. PATENT DOCUMENTS

| | | | | |
|---|---|---|---|---|
| 2,030,360 A | * | 2/1936 | Dyer | 383/61 |
| 2,107,216 A | * | 2/1938 | Rogers | 383/38 |
| 2,519,290 A | * | 8/1950 | Saltz | 383/61.2 X |
| 2,674,289 A | * | 4/1954 | Silverman | 383/61 |
| 3,102,570 A | * | 9/1963 | Fairchilds | 383/61 X |
| 3,245,448 A | * | 4/1966 | Rea | 383/97 X |
| 3,292,748 A | * | 12/1966 | Rifkin | 383/61 X |
| 3,998,304 A | * | 12/1976 | Edgerton, Jr. et al. | 383/61 X |
| 4,155,453 A | * | 5/1979 | Ono | 383/61 X |
| 4,167,175 A | * | 9/1979 | Malafouris | 383/97 X |
| 4,262,801 A | * | 4/1981 | Avery | 383/61 X |
| 4,489,770 A | * | 12/1984 | Reich, II | 383/97 X |
| 4,637,063 A | * | 1/1987 | Sullivan et al. | 383/61 |
| 4,790,051 A | * | 12/1988 | Knight | 383/61.3 X |
| 4,951,666 A | * | 8/1990 | Inman et al. | 383/901 X |
| 5,427,453 A | * | 6/1995 | Cloessner | 383/38 |
| 5,645,205 A | * | 7/1997 | Kennedy | 383/113 X |
| 5,775,561 A | * | 7/1998 | Kennedy | 383/113 X |
| 6,073,772 A | * | 6/2000 | Forbes et al. | 206/527 |

FOREIGN PATENT DOCUMENTS

| | | | | |
|---|---|---|---|---|
| DE | 1045896 | * | 12/1958 | 383/61 |
| JP | 405056809 A | * | 3/1993 | 383/61 |

* cited by examiner

Primary Examiner—Jes F. Pascua
(74) Attorney, Agent, or Firm—Simmons, Perrine, Albright & Ellwood PLC

(57) ABSTRACT

A garment bag for controlling the odors incident upon hunters' clothing stored prior to hunting, the bag having an integrated vapor barrier and serially operated zippers separated by a foldable zipper separator.

5 Claims, 2 Drawing Sheets

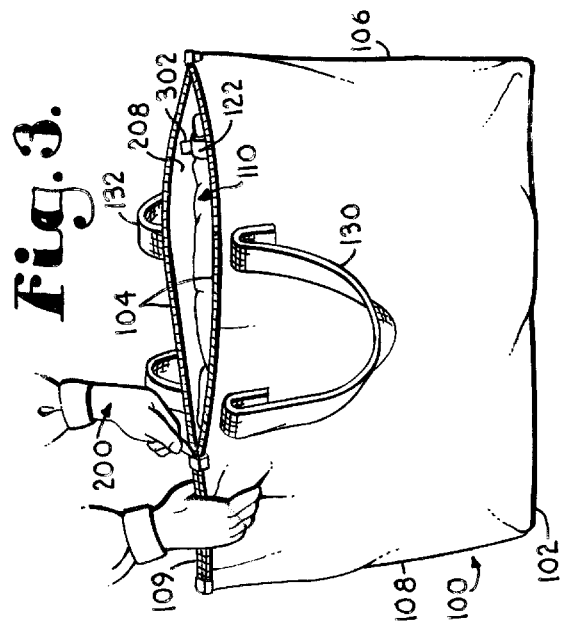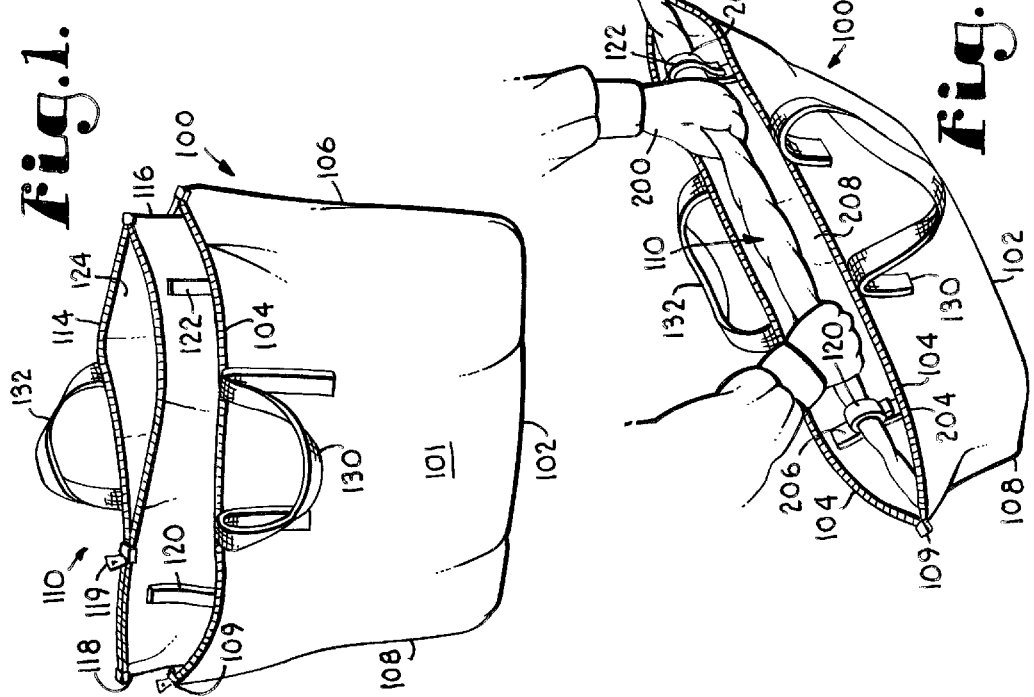

GARMENT BAG HAVING ODOR AND SCENT-CONTROLLING CAPABILITIES

FIELD OF THE INVENTION

The present invention generally relates to luggage and more particularly relates to odor-controlling luggage and even more particularly relates to a scent bag for protecting garments worn by hunters from absorbing undesirable odors. Various hunters, especially hunters of large mammals having well developed olfactory senses, are concerned about odors that might be emitted by the clothing they wear during hunting. Special care is taken to rid these clothes from odors normally associated with humans and other sources of odors not typically found in nature; e.g. special scent-free detergents are used to wash the clothing of the hunter, as well as adding a natural additional scent to emit a desirable (non-human) odor to cover up the remaining human and unnatural odors.

While these approaches have been used in the past to assist hunters in odor control, they often have difficulty transporting their scent free or scented clothing while traveling. Frequently, hunters have used large tightly sealing plastic bags (often called zip-lock bags having zip-lock seals which are typically a sliding sealer of a ridge on one side fitting into a resilient trough on the opposing side), other hunters have used garbage bags or normal garment bags. Each of these approaches has some drawbacks. Often, the plastic bags, the garment bags and the garbage bags have their own undesirable odor associated with them. For example, it is difficult to rid a typical garment bag of odors that it may have acquired from previous uses. Also, it is difficult to wash any odors from a garbage bag. The plastic bags and the garbage bags are often punctured when they are handled during transportation. Additionally, such garment bags can allow penetration of odors through zippers and other openings, especially if the bag is carried in the trunk compartment of an automobile where numerous offensive odors may be present.

Consequently, there exists a need for an improved bag for transporting scented and scent-free clothing for hunters which overcomes these difficulties.

SUMMARY OF THE INVENTION

It is an object of the present invention to provide an odor-controlling garment bag.

It is a feature of the present invention to include multiple zipper closures to prevent and restrict airflow into and out of the bag.

It is an advantage of the present invention to provide easy access in and out of the bag while allowing for much restricted airflow through the openings in which clothing can be inserted.

It is another feature of the present invention to include a vapor barrier disposed inside the bag for restricting airflow through the material from which the bag is made.

It is another advantage of the present invention to provide for durable material to be used as the primary structural material of the bag while incorporating a vapor barrier to prevent and restrict airflow and transmission of odors.

The present invention is a method and apparatus which is designed to satisfy the aforementioned needs, provide the previously stated objects, include the above-listed features, and achieve the already articulated advantages. In the present invention, the transmission of odors from a garment disposed inside a bag is reduced.

Accordingly, the present invention is a method and apparatus for transporting a scent-free or scent-controlled garment in a bag which restricts the transfer of odors to and from the contents of the bag through use of serial zipper enclosures and further including a vapor barrier.

BRIEF DESCRIPTION OF THE DRAWINGS

The invention may be more fully understood by reading the following description of preferred embodiments of the invention, in conjunction with the appended drawings wherein:

FIG. 1 is a perspective elevation view of a preferred embodiment of the present invention showing both zipper closures and showing the placement of the outer zipper closure in a position about and surrounding the inner zipper closure.

FIG. 2 is a perspective top view of a preferred embodiment of the present invention in which the outer zipper is in an open position and the inner zipper has been closed and rolled into a vapor barrier.

FIG. 3 is a perspective elevation view of the preferred embodiment of the present invention in which the inner zipper has been placed completely within the bag and is in the process of being enclosed by the outer zipper.

DETAILED DESCRIPTION

Figure 4A:
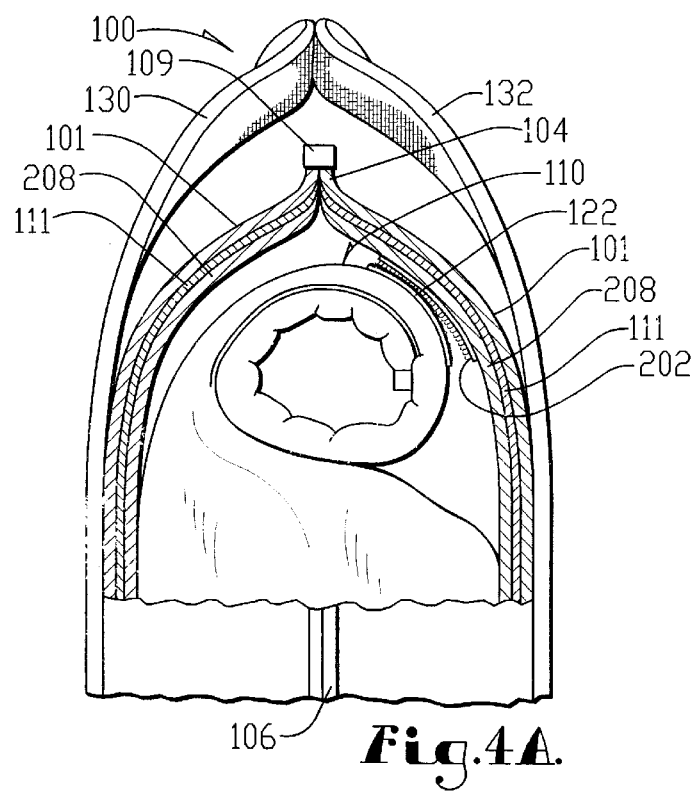
FIG. 4A is a cross-sectional view of a top portion of the present invention showing the relationship of the handles, outer zipper and the top of the bag as they might be arranged if the bag were being held by the handles. Vapor barrier 111 is shown hatched as aluminum foil.

Now referring to the drawings, where like numerals refer to like matter throughout, and more particularly to FIG. 1, there is shown a scent-controlling garment bag generally designated 100 having a bottom edge 102 and a top zippered edge 104, a first side 106 and a second side 108. The bag 100 further has an odor-controlling and airflow-restricting apparatus generally designated 110 disposed within the bag 100 and extending through the zippered opening at the top end of the bag 104. When the bag is being sealed, the odor-controlling and airflow-restricting apparatus 110 is rolled inside of the bag 100 and has a top zippered section 114, a first side 116 and a second side 118. Apparatus 110 further has a bottom side (not shown in FIG. 1) which is sewed to the interior of bag 100. Apparatus 110 is further shown having adhesive strips 120 and 122 which are preferably of the latch and hook type adhesive commonly known as Velcro. Also shown in FIG. 1 is a first handle 130 and a second handle 132 which are attached to the exterior of the bag 100 between the top edge 104 and the bottom edge 102. Also shown in FIG. 1 is a zipper 109 disposed along the top edge 104 of bag 100, and there is also shown a second interior zipper 119 which is disposed along the top edge 114 of apparatus 110.

Now referring to FIG. 2, there is shown the bag 100 with apparatus 110 being rolled by a users 200. Also shown are Velcro strips 202, 204, and 206 which are affixed to the lining 208 of apparatus 110.

Now referring to FIG. 3, there is shown the bag 100 with the apparatus 110 fully rolled into the bag 100 with the user 200 closing the bag by manipulating zippered top edge 104. Also shown is a Velcro strip 302 affixed to lining 208.

Now referring to FIG. 4A, there is shown a cross-sectional view of a top portion of the bag 100. The handles 130, 132 are shown arranged as they would be if the bag were being carried. The bottom 102 of the bag is not shown. Vapor barrier 111 is hatched to show that it is aluminum foil.

Figure 4B:
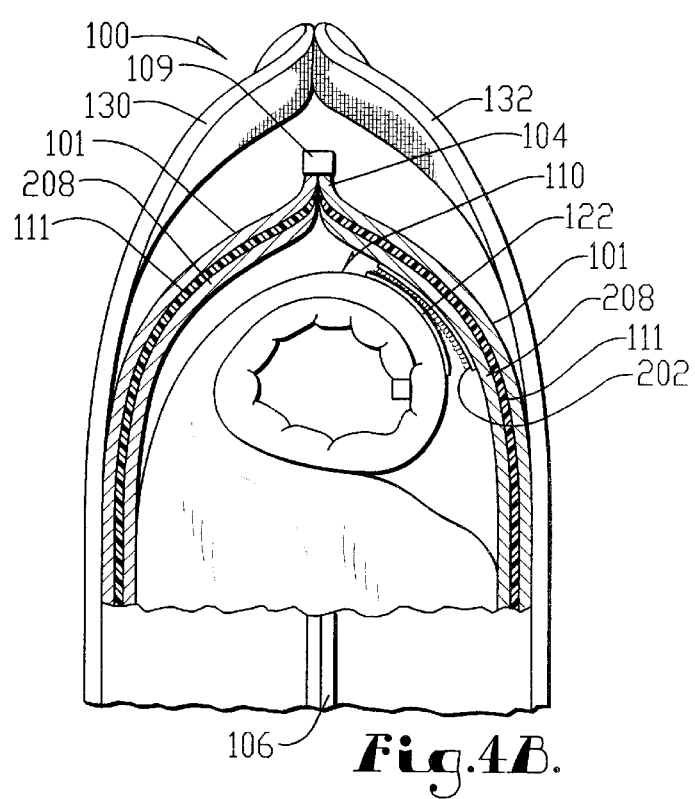
FIG. 4B is identical to FIG. 4A except that vapor barrier 111 is hatched as a plastic material.

FIG. 4B is identical to FIG. 4A except that vapor barrier 111 is hatched to show it as a plastic material.

Now referring to the figures, the preferred materials and construction techniques are as follows: the exterior fabric of the bag is preferably a woven nylon material, but other materials with some or all of the following characteristics could be substituted in certain circumstances: pliable, durable, water repellant, snag resistant, lightweight, and inexpensive. The lining of bag 100 is preferably made of the same material as the exterior; however, it is understood that a lighter weight, less durable material may be used under certain circumstances, especially where weight or cost is critical. A vapor barrier 111 is disposed between the linings 124 and 208 of bag 100 and apparatus 110. The vapor barrier 111 is preferably a sheet of aluminum foil sandwiched between the exterior material and the linings. It is preferable that all parts of the bag be secured to each other with high strength sewing techniques; however, any other securing means could be substituted, such as adhesives, fusing or bonding the material together with heat, pressure, solvents, or a combination thereof, or any other means now in the garment or luggage industries. Zippers are preferred as closing means, but sliding sealers (as in zip-lock bags) and other methods could be substituted.

It is thought that the method and apparatus of the present invention will be understood from the foregoing description and that it will be apparent that various changes may be made in the form, construction, steps and arrangement of the parts and steps thereof, without departing from the spirit and scope of the invention or to sacrificing all of their material advantages. The form herein described being merely a preferred or exemplary embodiment thereof.

We claim:

1. A garment bag comprising:
   a multi-layer bag having a bottom side, left side, right side and a top side;
   wherein said multi-layer bag comprises at least one layer of material which is non-odor permeable;
   at least two of said sides having a first zipper coupled thereto for creating a selectively open and selectively closed port into the bag;
   an airflow restricting apparatus disposed inwardly of said sides and open to manipulation through, said at least one side having a first zipper coupled thereto; and
   said airflow restricting apparatus having a second zipper coupled thereto and said airflow restricting apparatus is configured such that when said airflow restricting apparatus is positioned in an open configuration, said airflow restricting apparatus will allow access to an interior portion of said bag and said airflow restricting apparatus, when folded in a closed position, will restrict airflow into said interior portion;
   whereby said first zipper and said second zipper are operating serially to selectively permit access to an interior portion of said bag.

2. A garment bag comprising:
   a bag having a first side and a second side;
   at least one of said sides having a first closing device coupled thereto for creating a selectively open and selectively closed port into the bag;
   a vapor barrier disposed inwardly of said sides;
   an airflow restricting apparatus disposed inwardly of said sides and open to manipulation through, said at least one side having a closing device coupled thereto;
   said airflow restricting apparatus having a second closing device coupled thereto which when positioned in an open configuration allows access to an interior portion of said bag;
   a liner disposed inwardly of said vapor barrier;
   whereby said first closing device and said second closing device are operating serially to selectively permit access to an interior portion of said bag; and
   wherein said airflow restricting apparatus is folded inwardly to said interior portion of the bag and inwardly of opposing portions of said liner and inwardly of opposing portions of said vapor barrier.

3. A method of controlling odors incident upon clothing comprising the steps of:
   providing a lined container having an exterior surface and an interior lining having predetermined characteristic for vapor penetration;
   providing a non-odor permeable vapor barrier disposed between said exterior surface and said interior lining for augmenting said predetermined characteristic for vapor penetration of said container;
   providing a plurality of serially operated zippers coupled with said container;
   inserting clothing through said plurality of serially operated zippers and restricting access to said clothing by manipulating a first of said zippers;
   folding a portion of said container coupled to said first of said zippers; and
   manipulating a second of said zippers to further inhibit airflow into said container.

4. A method of storing scented objects comprising the steps of:
   providing a container having a first side and a second side, each having a predetermined characteristic for vapor penetration;
   providing serially operated access restricting devices coupled with said container;
   inserting a first object, having a predetermined scent characteristic, through said serially operated access restricting devices and restricting access to said object by manipulating said access restricting devices;
   wherein said first object is an article of clothing and wherein said predetermined scent characteristic is a predetermined cover scent having properties such that said predetermined cover scent is unable to permeate through said first side; and
   wherein said serially operated access restricting devices are arranged such that a first of said serially operated access restricting devices is disposed on an upper portion of said container, which upper portion is configured so as to be folded so as to restrict airflow through said first of said serially operated access restricting devices.

5. A method of claim 4 wherein said portion of said container is repeatedly folded.

* * * * *

UNITED STATES PATENT AND TRADEMARK OFFICE
CERTIFICATE OF CORRECTION

PATENT NO.     : 6,561,355 B1
DATED          : May 13, 2003
INVENTOR(S)    : David R. Forbes et al.

It is certified that error appears in the above-identified patent and that said Letters Patent is hereby corrected as shown below:

Title page,
Item [30], a continuity statement should be added to the face of the patent as follows:
-- This is a continuation of Application No. 09/078,997 filed on May 14, 1998, now issued as U.S. Patent No. 6,073,772 on June 13, 2000. --
Item [56], the following reference should be listed as a Reference Cited:
-- 2,442,044     5/1948          Howard          383/61 X --

Signed and Sealed this

Twenty-third Day of September, 2003

JAMES E. ROGAN
*Director of the United States Patent and Trademark Office*